United States Patent
Konno et al.

(10) Patent No.: US 6,492,350 B2
(45) Date of Patent: Dec. 10, 2002

(54) CHITIN OLIGOSACCHARIDES AND/OR CHITOSAN OLIGOSACCHARIDES FOR PREVENTING OR TREATING COMMON COLD OR TREATING PAIN

(75) Inventors: Allen I. Konno, Kailua-Kona, HI (US); Jay H. Gauthier, Holualoa, HI (US); Yoshiharu Matahira, Shimada (JP)

(73) Assignee: JDC (Hawaii) Inc., Kailua-Kona, HI (US)

( * ) Notice: Subject to any disclaimer, the term of this patent is extended or adjusted under 35 U.S.C. 154(b) by 112 days.

(21) Appl. No.: 09/758,210

(22) Filed: Jan. 12, 2001

(65) Prior Publication Data

US 2002/0022601 A1 Feb. 21, 2002

Related U.S. Application Data

(60) Provisional application No. 60/177,572, filed on Jan. 27, 2000, and provisional application No. 60/177,573, filed on Jan. 27, 2000.

(51) Int. Cl.[7] .................. C08B 37/08; A61K 31/70; A61K 31/727

(52) U.S. Cl. .................. 514/55; 514/20; 514/25; 536/4.1; 536/20

(58) Field of Search .................. 536/4.1, 20; 514/53, 514/25, 55

Primary Examiner—Peter O'Sullivan
(74) Attorney, Agent, or Firm—Arent Fox Kintner Plotkin & Kahn, PLLC

(57) ABSTRACT

A new method is presented which is useful in the prevention of the common cold (also called non-allergic rhinitis, viral upper respiratory tract infection, viral URI, etc and for this presentation will be referred to as the "common cold") in mammals, including humans, and which also lessens the duration and intensity of the symptoms of the said condition should infection occur. Within the scope of the present invention is a method of treating pain in mammals, such as humans. The active ingredient in these methods can be a water soluble mixture available in oral form and selected from the chitin oligomers di N-acetyl chitobiose, tri N-acetyl chitotriose, tetra N-acetyl chitotetraose, penta N-acetyl chitopentaose, and hexa N-acetyl chitohexaose, with the water soluble oral chitosan oligomers selected from chitobiose, chitotriose, chitotetraose, chitopentaose, chitohexaose, and chitoheptaose.

23 Claims, No Drawings

CHITIN OLIGOSACCHARIDES AND/OR CHITOSAN OLIGOSACCHARIDES FOR PREVENTING OR TREATING COMMON COLD OR TREATING PAIN

The instant application claims the benefit of provisional U.S. patent applications, Nos. 60/177,572 and 60/177,573, both filed on Jan. 27, 2000, the disclosures of both are hereby incorporated by reference.

FIELD OF THE INVENTION

The invention relates to a method for preventing or treating common cold or treating pain by administering a new agent comprising a) at least one chitin oligosaccharide; b) at least one chitosan oligosaccharide; c) at least one partially deacetylated chitin oligosaccharide, wherein some, but not all, of the N-acetyl glucosamine or 2-acetamido-2-deoxy-D-glucose subunits are de-acetylated; d) a mixture of at least one chitin oligosaccharide and at least one chitosan oligosaccharide; e) a mixture of at least one chitin oligosaccharide and at least one partially deacetylated chitin oligosaccharide; or f) a mixture of at least one chitosan oligosaccharide and at least one partially deacetylated chitin oligosaccharide to a subject in need of common cold prevention or treatment or pain treatment. The new agent may further comprise N-acetyl glucosamine and/or glucosamine. The new agent may induce analgesia by absorbing, binding, or otherwise inhibiting bradykinin and ions at the nerve endings as its mechanism. This invention also relates to an oral method of delivery. The new agent is useful in the prevention of the common cold (non-allergic rhinitis, viral upper respiratory tract infection, viral URI, etc) and in reducing the duration and severity of the symptoms of such an infection should this occur.

BACKGROUND OF THE INVENTION

The common cold, one of mankind's most frequent disease afflictions (also called non-allergic rhinitis, viral upper respiratory tract infection, viral URI) is a contagious infectious disease that, while usually self-limiting and non-fatal, has long been a source of limitless suffering with huge expenditures of time and money, as well as being a leading cause of doctor visits. Very few humans escape infection each year and most will suffer multiple infections. It is estimated that most adults will suffer 2–5 colds per year while infants and pre-school children may have 4–8 such infections each year (1). In the course of a year, individuals in the U.S. suffer from over one billion colds which are a leading cause of school and job absenteeism as well as doctor visits. Broken down further, children have more colds than adults probably due to their relative lack of resistance to infection and to contact with other infected children in school and daycare centers. Women, particularly in the age range 20–30, have more colds than men due to their closer contact with children (2). The economic impact of the common cold can only be estimated. According to the National Center for Health Statistics, in 1995, 61 million cases of the common cold required medical attention. There were 58 million bed days lost to the common cold, 24 million days of restricted activity, and 22 million lost school days (3). The exact dollar figure spent or lost can only be estimated but probably is in the tens of billions. (It should be noted that these figures are for the United States only).

Although rarely fatal in and of itself, the common cold may lead to more serious complications in the very young, the very old, and those that are immunocompromised. Such complications include bacterial suprainfection, pneumonia, bacterial sinusitis, and otitis media. In addition, the common cold is responsible for many exacerbations of asthma, a serious multi-billion dollar per year respiratory disease responsible for over 5,000 deaths per year, a figure that keeps rising (4,5,6).

Yet despite the prevalence, destructiveness, and costs of the disease, surprisingly little or no progress has been made toward effective cold treatment (7). Antibiotics, which are prescribed with disturbing frequency by practitioners and demanded by patients who want "something done", are ineffective both theoretically and in practice since the common cold is caused by a virus, not a bacteria (see Detailed Description of the Invention for a discussion of the pathology of the common cold) (8, 9, 10). In fact, the misuse and over-prescription of antibiotics for the common cold has led to dangerous mutant resistant strains of micro-organisms such as MRSA (methacillin resistant staphylococcus aureus). Vitamin C, as proclaimed by two-time Nobel Prize winner Dr. Linus Pauling, has also been reputed to both prevent colds and decrease the symptoms should a cold occur, when given in so-called "mega doses" ie>5–10 grams per day (RDA=65–130 mg per day). However, numerous studies since Dr. Pauling's work have failed to duplicate his results, and the role of vitamin C, if any, is still open to debate (11, 12, 13, 14, 15). Over-the-counter cold prescriptions invariably act to suppress symptoms locally through actions against such things as histamine (the antihistamine group of drugs ie Benadryl) or through various actions on the autonomic nervous system (such as ephedrine-a sympathomimetric amine. It should be noted that these drugs have side effects, some of which can be serious. Other experimental drugs such as BIRR 4 (also called tremacara) must be applied directly to the nose before being exposed to the virus, which does little good for the average individual who has no idea when or where he will come in contact with the cold virus. However, experiments involving tremacara have proven clinically the theoretical efficacy of blocking the rhinovirus/ICAM-1 receptor sites for reducing the severity of rhinovirus cold infections. A variety of alternative and folk remedies (zinc, ecchinacea, etc) have also been used over the years with variable and largely unreproducable results (16,17). Thus, there is a need for an agent effective in preventing and/or treating common cold. The present invention concerns such an agent and a method of preventing and/or treating common cold.

Pain and the suffering it causes is one of the oldest afflictions known to man/ The relief of such pain and suffering has long been one of the most solemn duties of the health professional. Between 75–100 million Americans suffer from chronic pain; osteoarthritis alone affects over 25 million Americans and over 40 million experience chronic recurring headaches. Upwards of $4,000,000,000 are spent on pain medication alone (not to mention physician fees, lost work time, hospitalization, etc) and it is estimated that chronic pain may play a factor in up to 50% of suicides. Yet despite the expense and trouble, 60–80% of people say that they are dissatisfied with their pain medication (28).

The International Association for the Study of Pain defines pain as "an unpleasant sensory or emotional experience arising from actual or potential tissue damage or described in terms of such damage".

Acute pain is one dimensional and is always a sign or symptom of underlying pathology. Chronic pain (arising from a chronic condition, an injury that lasts longer than expected, or for which there is no known cause i.e. fibromyalgia) is considered to be without purpose and may be properly considered a disease.

Analgesics have classically been considered into three major groups:
1) central acting (opioids, tramadol);
2) peripheral acting (non-steroidal anti-inflammatory drugs also called NSAIDS as well as acetaminophen commonly called Tylenol); and
3) local (steroid injections, etc).

The opioids variably block and stimulate certain areas of the brain involved in pain and its perception. However, all narcotics can and do cause:
- increasing tolerance (more and more of the drug is required as time goes on to achieve the same analgesic effect);
- nausea and vomiting;
- other gastrointestinal effects such as abdominal pain, constipation, and diarrhea;
- addiction, with all of its social, legal, and financial implications as well as its toll on health;
- overdose; and
- sudden death (idiosyncratic reaction).

The peripheral acting agents which includes NSAIDS such as aspirin and other salicylates, ibuprofen, indomethacin, etc work by inhibiting the cyclooxygenase (COX) enzyme system in inflammatory cells thereby inhibiting prostaglandins and thus are of limited value in painful conditions where inflammation is not a prominent feature of the disease (such as osteoarthritis). Side effects of the NSADS include:
- gastrointestinal symptoms such as heartburn, gastritis, ulcers, bleeding and hemorrhage compounded by
- a prolonged bleeding time and platelet dysfunction;
- kidney problems such as fluid and electrolyte imbalance, renal papillary necrosis, etc.; and
- cardiovascular disorders such as high or low blood pressure, interference with other heart medications, etc.

The use of NSAIDS results in about 20,000 deaths and about 200,000 hospitalizations per year in the United States (28).

Acetaminophen (Tylenol) was developed in part to diminish these rather disturbing morbidity and mortality statistics. The exact mechanism of action of acetaminophen is not known, but it is believed that it may elevate the pain threshold. However, can and does cause liver damage and death when used in excess, especially in children.

Although considerable advances in the understanding of pain have been made, our understanding of the pathophysiology of chronic pain is incomplete (31). The disagreeably unpleasant sensation of pain is the result of an extremely complex series of events which are integrated at virtually all levels of the nervous system from the periphery via the dorsal horns of the spinal cord to the cerebrum and perhaps deeper structures (29).

Pain is frequently pathophysiologically classified into two groups:
1) nociceptive pain which results from stimulation of the nerve endings; and
2) neuropathic pain which results from actual damage to the nerves.

Nociceptive pain is further classified into:
1) visceral pain—described as "gnawing" or "throbbing"; and
2) somatic pain—described as "dull" or "aching".

Neuropathic pain is usually described as "sharp", "burning" or "shooting".

Nociceptors can be defined as sensory receptors that are activated by noxious stimuli that damage or threaten the body's integrity. Nociceptors belong to the slowly conducting afferent A delta and C fibers and may be further classified according to their responses to mechanical, chemical and thermal stimuli (30). They may be found in the skin, deep tissues and viscera, and as free nerve endings. Stimulation and pain is accomplished via thermal mechanisms and ionic changes and are mediated through a variety of substances such as prostaglandin E2 (which the COX inhibition of NSAIDS effects), free radicals, and kinins such as bradykinin.

Bradykinin is formed in the blood from precursor kininogens and is a nonapeptide with the following amino acid sequence:
Arg-Pro-Pro-Gly-Phe-Ser-Pro-Phe-Arg It has a molecular weight of 1418.5 and is found in the plasma, the blood, in endothelium, and in the damaged tissue itself. It is released from kininogens by the action of kallikrein enzymes (32) and evokes a variety of biological responses besides the induction of pain including smooth muscle contraction and relaxation as well as inflammation.

Bradykinin exerts its pain inducing effects via binding to receptor sites on the sensory neurons. Bradykinin receptors are cell-surface G-protein coupled receptors and are of two types called B1 and B2, although it appears certain that there are more subsets in each category.

B1 receptors appear to be important modulators of pain and inflammation but their overall role is not clear at this point; they appear to be more involved with chronic inflammatory responses and persistent hyperalgesia after injury (33).

B2 receptors are the more important in mediating pain as well as more classic events involving inflammation such as edema, etc. Evidence suggests that bradykinin is bound partially by the helical bundle of the receptor with the amino terminus actually protruding from the extracellular side of the helical bundle of the receptor (34).

Peptide bradykinin antagonists have been studied, but their use is limited due to poor oral absorption and very short duration of action.

Non-peptide bradykinin antagonists, until now, have come from plants and include flavonoids and terpenes as well as certain synthetics such as pregnane glycoside compounds. However, these non-peptide bradykinin antagonists suffer disadvantages, e.g. these antagonists are relatively difficult to obtain. As a result, there is a need for other non-peptide bradykinin antagonists. The agent of the present invention fulfills such a need.

SUMMARY OF THE INVENTION

One aspect of the present invention concerns an agent comprising
 a) at least one chitin oligosaccharide;
 b) at least one chitosan oligosaccharide;
 c) at least one partially deacetylated chitin oligosaccharide, wherein some, but not all, of the N-acetyl glucosamine or 2-acetamido-2-deoxy-D-glucose subunits are de-acetylated;
 d) a mixture of at least one chitin oligosaccharide and at least one chitosan oligosaccharide;
 e) a mixture of at least one chitin oligosaccharide and at least one partially deacetylated chitin oligosaccharide; or
 f) a mixture of at least one chitosan oligosaccharide and at least one partially deacetylated chitin oligosaccharide,
to function as a non-peptide, bradykinin antagonist. Preferably, the chitin oligosaccharide and/or chitosan oligosaccharide is water soluble. In addition to component a) to f), the agent of the present invention may further comprise N-acetyl glucosamine and/or glucosamine. The agent of the present invention is also effective in preventing and/or treating common cold. The agent can be absorbed systemically after being administered orally.

The agent of the present invention is a novel analgesic and is:

effective against mild, moderate and severe pain;

effective against a variety of types of pain (pain associated with cancer, fibromyalgia, toothache, headache, etc);

has no known serious adverse side effects;

is non-addicting;

is safe for children, adults, and pregnant females; and is orally administered.

To understand the mechanism of action of the agent (i.e. the agent comprising at least one chitin oligosaccharide, at least one chitosan oligosaccharide, or a mixture of at least one chitin oligosaccharide and at least one chitosan oligosaccharide) of the present invention in the prevention and therapy of the common cold, an explanation of the pathobiology of the disease is necessary.

The etiologic agent of the common cold is a virus, a micro-structure characterized by a nucleic acid (either DNA or RNA) enclosed in a protein capsid. Although a number of types of virus (adenovirus, coronavirus, etc) have been shown to be capable of causing the classic symptoms of cold, the most prevalent (40–70% depending upon the study) organism is the rhinovirus. The rhinovirus is a 30 nm RNA virus with over 100 serotypes (some studies say over 200) that belongs to the Picornaviridae family (so does polio virus) and replicates only in primates. The single-stranded positive genome acts as a template for both RNA synthesis and viral replication. The rhinovirus is made of 60 geometric arrangements called isocahedrons and there are four viral proteins named VP1, VP2, VP3, VP4; the whole conformation is known as a pentamer which is formed by the chain of carbon atoms composing each viral particle. The isocahedrons demonstrate deep "canyons" or "valleys" in their surface and thus present at least 60 different sites to bind to intercellular adhesion molecule one (ICAM-1). Thus, the viral-receptor attachment site lies in a cavity that is inaccessible to the host's antibodies. In addition to the above and to the large number of different serotypes of rhinovirus, there is no common antigen found among rhinovirus, thus inhibiting development of an effective cold vaccine.

Rhinoviruses are transmitted mainly via direct or indirect contact with infected secretions and invade their host by binding to the ICAM-1 receptor on the nasal epithelium.

ICAM-1 (intercellular adhesion molecule one) is a single protein that normally functions by binding leukocytes in places and in regions of the body where required. It has been shown to shaped somewhat like and arm with 5 sections or domains. Near the "hand" end of the molecule are 3 finger-like projections; this is where the rhinovirus attaches. The deep "canyons" and "valleys" on the capsid of the rhinovirus fits onto these projections and thus the virus can gain entry into the cells with little or no detection by the immune system. It should be noted that each cell may contain thousands of these receptor sites on the cell membrane; thus, infection, viral replication, and clinical disease may be relatively simple and rapid.

Although the exact events in the pathobiology of human rhinovirus infection from exposure through clinical disease to recovery has not been completely elucidated, the sequence of events has been determined to be exposure to the virus via direct (coughing, sneezing, etc) or indirect (dirty hands, utensils, etc) contact. The virus then attaches to the receptor sites on the ICAM-1 molecule and due to the geography and stereo-chemistry of both the virus and receptor is relatively hidden from the immune system. The virus then gains entry into the nasal epithelial cells and begins replication. With viral replication, certain pro-inflammatory substances are produced, including bradykinin (and histamine) which are released and the well-known clinical symptoms are produced (watery itchy eyes, congestion, runny nose, cough sneezing, etc). The sequence of exposure, attachment to receptor site, cell entry, viral replication and the release of inflammatory substances with clinical illness offers the mechanism of common cold prevention and symptom reduction offered by the agent of the present invention.

DETAILED DESCRIPTION OF THE INVENTION

Chitin is a naturally occurring biorenewable aminopolysaccharide consisting of N-acetyl glucosamine residues joined by β-(1–4) glycosidic links. Chitosan is a de-acetylated chitin and is similarly joined by β-(1–4) links. The basic chemical structures of some chitin and chitosan are shown in formulae 1 and 2, respectively.

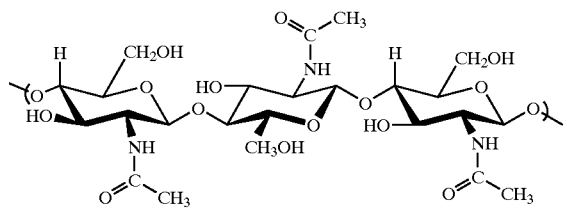

Formula I

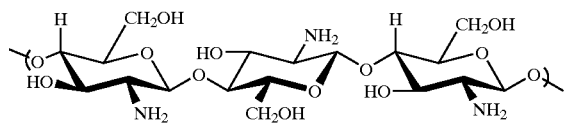

Formula II

The molecular weight of chitin or chitosan may be over 1,000,000. (chitin and chitosan can be structurally arranged in what is known as the "chair form", which also has "canyons" ). Chitin and chitosan are poorly absorbed orally (20–40%) and should be broken down into smaller (e.g. 2–12, 2–10 or 2–8 subunits) residues by processing in order to achieve complete absorption and thus systemic medical effect.

The term, "chitin oligosaccharide", means an oligosaccharide having 2 to about 14, preferably 2 to about 12, more preferably 2 to about 10, even more preferably 2 to about 8, N-acetyl glucosamine subunits linked together. The chitin oligosaccharide can be selected from N-acetyl chitobiose, di-N-acetyl chitobiose, tri-N-acetyl chitotriose, tetra-N-acetyl chitotetraose, penta-N-acetyl chitopentaose, hexa-N-acetyl chitohexaose, hepta-N-acetyl chitoheptose, and octa-N-acetyl chitooctose. The term, "chitosan oligosaccharide", means any chitin oligosaccharide having all of the N-acetyl groups removed.

The agent of the present invention can contain a combination of some or all of the chitin oligosaccharides selected from the group consisting of N-acetyl chitobiose, di-N-acetyl chitobiose, tri-N-acetyl chitotriose, tetra-N-acetyl chitotetraose, penta-N-acetyl chitopentaose, hexa-N-acetyl chitohexaose, hepta-N-acetyl chitoheptose, and octa-N-acetyl chitooctose in any proportion (e.g. in equal proportion; in a 2:1:1:1:1:1:1:1 proportion if 8 chitin oligosaccharides are present with one of the chitin oligosaccharides as the major chitin oligosaccharide component present in 2 of 9 parts by mole or by weight of the total amount of chitin oligosaccharides present in the agent; or in a 3:2:1:1:1 proportion if 5 chitin oligosaccharides are present with one of the chitin oligosaccharides as the major chitin oligosaccharide component present in 3 of 8 parts by mole or by weight and another of the chitin oligosaccharides as the second major chitin oligosaccharide component present in 2 of 8 parts by mole or by weight of the total amount of chitin oligosaccharides present in the agent).

The chitosan oligosaccharide can be selected from chitobiose, chitotriose, chitotetraose, chitopentaose, chitohexaose, chitoheptaose and chitooctose. The agent of the present invention can also contain a combination of some or all of chitobiose, chitotriose, chitotetraose, chitopentaose, chitohexaose, chitoheptaose and chitooctose in any proportion (e.g. in equal proportion; in a 2:1:1:1:1:1:1:1 proportion if 8 chitosan oligosaccharides are present with one of the chitosan oligosaccharides as the major chitosan oligosaccharide component present in 2 of 9 parts by mole or by weight of the total amount of chitosan oligosaccharides present in the agent; or in a 3:2:1:1:1 proportion if 5 chitosan oligosaccharides are present with one of the chitosan oligosaccharides as the major chitosan oligosaccharide component present in 3 of 8 parts by mole or by weight and another of the chitosan oligosaccharides as the second major chitosan oligosaccharide component present in 2 of 8 parts by mole or by weight of the total amount of chitosan oligosaccharides present in the agent).

In the agent of the present invention, at least one chitin oligosaccharide (i.e. chitin oligomer), preferably water soluble, may be present. The chitin oligosaccharide can contain more preferably 2 to about 10, even more preferably 2 to about 8, e.g. 2, 3, 4, 5 or 6, N-acetyl glucosamine or 2-acetamido-2-deoxy-D-glucose subunits. More preferred oligosaccharides of chitin include di-N-acetyl chitobiose, tri-N-acetyl chitotriose, tetra-N-acetyl chitotetraose, penta-N-acetyl chitopentaose, and hexa-N-acetyl chitohexaose. The agent of the present invention can contain a combination of different chitin oligosaccharides having different numbers (e.g. 2 to about 10, preferably 2 to about 8, more preferably 2 to about 6, and also more preferably about 4 to about 6 N-acetyl-glucosamine subunits) of N-acetyl-glucosamine subunits. For instance, the combination of different chitin oligosaccharides can be a mixture of different chitin oligosaccharides having 2, 3, 4, 5 and 6 N-acetyl-glucosamine subunits. Similarly, the combination of different chitin oligosaccharides contained in the agent of the present invention can be a mixture of different chitin oligosaccharides having 4, 5 and 6 N-acetyl-glucosamine subunits.

The agent of the present invention can contain at least one, preferably water soluble, partially deacetylated chitin oligosaccharide. The partially deacetylated chitin oligosaccharide can be any of the chitin oligosaccharides disclosed above with one or more, but not all, of the N-acetyl groups removed. The agent of the present invention can contain a combination of different partially deacetylated chitin oligosaccharides having different numbers (e.g. 2 to about 10, preferably 2 to about 8, more preferably 2 to about 6, and also more preferably about 4 to about 6 N-acetyl-glucosamine subunits) of N-acetyl-glucosamine subunits, wherein some of the N-acetyl groups are removed. For instance, the combination of different partially deacetylated chitin oligosaccharides contained in the agent of the present invention can be a mixture of different chitin oligosaccharides having 2, 3, 4, 5 and 6 N-acetyl-glucosamine subunits with some of the N-acetyl groups removed. Similarly, the combination of different partially deacetyled chitin oligosaccharides contained in the agent of the present invention can be a mixture of different chitin oligosaccharides having 4, 5 and 6 N-acetyl-glucosamine subunits with some of the N-acetyl groups removed.

The agent of the present invention can contain at least one, preferably water soluble, chitosan oligosaccharide (i.e. chitosan oligomer). The chitosan oligosaccharide can contain more preferably 2 to about 10, even more preferably 2 to about 7 or 8, e.g. 2, 3, 4, 5 or 6, glucosamine or 2-amino-2-deoxy-D-glucose subunits. More preferred oligosaccharides of chitosan include chitobiose, chitotriose, chitotetraose, chitopentaose, chitohexaose, and chitoheptaose. The agent of the present invention can contain a combination of different chitosan oligosaccharides having different numbers (e.g. 2 to about 10, preferably 2 to about 8, more preferably 2 to about 6, and also more preferably about 4 to about 6 glucosamine subunits) of glucosamine subunits. For instance, the combination of different chitosan oligosaccharides can be a mixture of different chitosan oligosaccharides having 2, 3, 4, 5 and 6 glucosamine subunits. Similarly, the combination of different chitosan oligosaccharides contained in the agent of the present invention can be a mixture of different chitosan oligosaccharides having 4, 5 and 6 glucosamine subunits.

The agent of the present invention, preferably, comprises a mixture of at least one chitin oligosaccharide and at least one chitosan oligosaccharide (CCOS). The at least one chitin oligosaccharide and at least one chitosan oligosaccharide can be the chitin oligosaccharides or combination of chitin oligosaccharides, and the chitosan oligosaccharides or combination of chitosan oligosaccharides disclosed above. Such a mixture preferably comprises di-N-acetyl chitobiose, tri-N-acetyl chitotriose, tetra-N -acetyl chitotetraose, penta-N-acetyl chitopentaose, hexa-N-acetyl chitohexaose, chitobiose, chitotriose, chitotetraose, chitopentaose, chitohexaose, and chitoheptaose.

Preferably, the chitin oligosaccharide, chitosan oligosaccharide and/or partially deacetylated chitin oligosaccharide ingredients of the agent of the present invention are water soluble. Being water soluble, these ingredients are well absorbed in the gastrointestinal tract and suitable for oral or intravenous administration. The ease of using water soluble chitin oligosaccharides, chitosan oligosaccharides and/or partially deacetylated chitin oligosaccharides imparts tremendous advantage over water insoluble polymers or oligosaccharides of chitin and/or chitosan.

In the method to prevent or treat common cold or to treat pain, the agent of the present invention can be administered at a dose of 0.01 mg/kg body weight to 10 g/kg body weight per day to a subject in need of the prevention or treatment of the common cold. The preferred dose is 0.1 mg/kg per day to 1 g/kg per day, and the more preferred dose is 1 mg/kg per day to 100 mg/kg per day. The agent, e.g. the mixture of chitin and chitosan oligosaccharides (CCOS), of the present invention can be administered orally (e.g. as a tablet, dietary supplement or food additive) or parenterally. Administration via the parenteral routes includes adminstering the agent dermally, by applying topically on a mucous membrane, by inhalation, intravenously, subcutaneously, intramuscularly, or intraperitoneally. The agent, e.g. the mixture of chitin and chitosan oligosaccharides (CCOS), of the present invention is effective in preventing or treating the common cold or treating pain in a subject, including animals and humans. The animal subjects can be non-human mammals.

The agent, e.g. the mixture of chitin and chitosan oligosaccharides (CCOS), of the present invention is effective if administered alone or in a pharmaceutical composition admixed with at least one pharmaceutically acceptable carrier. The pharmaceutical composition can be manufactured into a chewable tablet. The agent of the present invention, e.g. the CCOS mixture, can also be administered together with other agents, e.g. analgesics, antipyretics or nasal decongestants, commonly used in treating the common cold.

The chitin chitosan oligosaccharide mixture (CCOS) when taken orally in a dosage of about 100 mg TID, prevents the rhinovirus from binding to its receptor site on the ICAM-1 molecule found in the nasal epithelial cells. The virus is thus unable to gain entry into the nasal epithelium; disease and symptoms are prevented.

Should the viral load exceed the binding dosage capacity of the chitin chitosan oligosaccharide mixture or should the body be more susceptible for other reasons (concurrent illness, etc) infection, viral replication, and symptoms may ensue with the release of certain inflammatory substances and immune cytokines. Among the former is a substance called bradykinin. The most well-known clinical effect of bradykinin is the induction of pain, but as kinin (19) is involved with producing many of the symptoms associated with the common cold (20,21,22).

The agent of the present invention, e.g. the mixture of chitin chitosan oligosaccharides, blocks the action of bradykinin at its receptor sites, BR1 and Br2 (23), thus decreasing the severity and duration of symptoms.

Bradykinin is not the sole inflammatory kinin produced by rhinovirus infection. Among the other cytokines so produced is a substance called interferon gamma. Interferon gamma is a cytokine produced by T and B lymphocytes which activates, stimulates and otherwise affects a variety of immune functions such as natural killer cells (NK cells) activation, macrophage activation, stimulation of more T and B cells, etc. It has also been shown to down-regulate the expression of ICAM-1 in the human airway cells thus causing a reduction in viral titers (25). The said mixture of chitin chitosan oligosaccharides enhances the production of interferon gamma (26,27).and thus causes reduction of viral load and decreased substrate for infection.

Within the scope of the present invention, the agent, e.g. the mixture of chitin and chitosan oligosaccharides selected from di N-acetyl chitobiose, tri N-acetyl chitotriose, tetra N-acetyl chitotetraose, penta N-acetyl chitopentaose, hexa N-acetyl chitohexaose, and hepta N-acetyl chitoheptaose and chitosan oligosaccharides selected form chitobiose, chitotriose, chitotetraose, chitopentaose, chitohexaose, chitoheptaose, and chitooctose, of the present invention, can prevent infection by rhinovirus in the nasal musosa by blocking entry via receptor sites on the ICAM-1 molecule and the rhinovirus. Should overwhelming exposure occur and infection ensue, chitin chitosan oligosaccharides (CCOS) can decrease the length and severity of the symptoms by its actions on certain inflammatory kinins and cytokines; namely, CCOS blocks the receptor sites for bradykinin activity and enhances the production of the beneficial cytokine interferon gamma. CCOS may be given orally and has no side effects even when given in mega doses (ie>50 grams per day) to human subjects.

Preferably, the chitin oligosaccharide, chitosan oligosaccharide, partially deacetylated chitin oligosaccharide ingredients of the agent of the present invention are water soluble. These water soluble chitin and chitosan oligosaccharides can be prepared from chitin and chitosan polymers.

The chitin oligosaccharides and the chitosan oligosaccharides can be obtained by chemically or biochemically treating chitin which is prepared from the shells of crustaceans such as crabs, lobsters or shrimp with optional acid hydrolysis, or by chemical synthesis with a method known.

The chitin oligosaccharide can be obtained by subjecting chitin to partial hydrolysis by an acid or an enzyme and if required fractionating or purifying the one with the desired degree of polymerization form the hydrosylate by a method such as column chromatography or solvent fractionation. The preferred degree of polymerization is at the level of disaccharide to heptasaccharide namely di N-acetyl chitobiose, tri-N acetyl chitotriose, tetra N acetyl chitotetraose, penta N acetyl chitopentaose, and hexa N-acetyl chitohexaose. (see example 1).

The chitosan oligosaccharide can be obtained by partially hydrolyzing chitosan which is obtained by subjecting chitin to a hot concentrated alkali treatment. The partial hydrolysis of chitosan is carried out by heating with an acid such as hydrochloric acid, acetic acid, or formic acid. The acid is then removed or neutralized and desalted followed by crystallization to form a powder or a method wherein chitosan is dissolved in a dilute acid and then allowed to react with enzymes such as chitosanase or D-glucosaminidase. The degree of polymerization of the chitosan oligosaccharide is then a mixture of chitobiose, chitotriose, chitotetraose, chitopentaose, chitohexaose, and chitoheptaose (see example 2).

The mixture of chitin and chitosan oligosaccharides can then be available as a water soluble powder that can be taken orally or manufactured into a chewable tablet.

The partially deacetylated chitin oligosaccharide used an ingredient of the agent of the present invention can be prepared by removing, e.g. by acid treatment, the N-acetyl groups from some of the N-acetyl glucosamine subunits of a chitin oligosaccharide.

As stated above, the agent of the present invention can function as a non-peptide bradykinin antagonist. Whether this is due to the absorption of the bradykinin molecule into the "chair" of the CCOS molecule (chitin means "envelope" in Greek) or whether it blocks the bradykinin B2 receptor site is unclear. Blockage of the ionic charges mediated by bradykinin at the receptor sites is also postulated.

The evaluation of pain and its assessment presents several difficult problems (36, 37, 38) among which are:
pain can be an individual realization and is therefore difficult to evaluate
pain is difficult to quantify
pain is difficult to describe
pain is affected by attitudes and beliefs A number of methods have been proposed to study pain and analgesia. These include:
visual analogue scales (a line is drawn and pain is rated at one end as "zero pain" and the other end "worst imaginable pain")
pain questionnaires ie the McGill Pain Questionnaire (MPQ)
numeric scales (the patient rates his pain from 0-no pain, to 5 or 10-worst imaginable pain)
pain charts In our studies, a short form of the McGill Pain Questionnaire was used as developed by R. Melzak (1984). This modification is a hybrid form utilizing both a Visual Analogue Scale rating pain from 0 (no pain) to 5 (excruciating) as well as a pain questionnaire rating the pain from 0 (no pain) to 3 (severe) along with the following descriptions:

throbbing
shooting
stabbing
sharp
cramping
gnawing
hot-burning
aching
heavy
tender
splitting
tiring-exhausting
sickening
fearful
punishing-cruel

EXAMPLES

Example 1

(Preparation of Chitin Oligosaccharide Mixture-NACOS)
Crab→crust→elimination of protein→washing→elimination of calcium→Diluted alkali Diluted hydrochloride Chitin→hydrolysis→neutralization→de-coloring→filtration→conc. hydrochloride soda ash Active carbon Desalting by electrodialysis→Treatment through ion exchange resin→Vacuum concentration→spray drying→classification→packaging→final product
Analysis of the product (example):

| | |
|---|---|
| N-acetyl chitoglucosamine | 41.7% |
| N-acetyl chitobiose | 20.5% |
| N-acetyl chitotriose | 17.5% |
| N-acetyl chitotetraose | 11.7% |
| N-acetyl chitopentaose | 7.9% |
| N-acetyl chitohexaose | 0.7% |

The mixture of N-acetyl chitobiose, N-acetyl chitotriose, N-acetyl chitotetraose, N-acetyl chitopentaose and N-acetyl chitohexaose was an example of the chitin oligosaccharide mixture that could be produced.

Example 2

(Preparation of a Chitosan Oligosaccharide Mixture-COS)
Crab→crust→elimination of protein→washing→elimination of calcium→Diluted alkali Diluted hydrochloride Chitin→deacetylation→washing→chitosan→hydrolysis by chitosanase→treatment of hot alkali Destruction of chitosanase→de-coloring→filtration→spray drying→Classification→packaging→final product In the processing of chitosan oligosaccharide, the hydrolysis is by an enzymatic reaction; therefore, no glucosamine will be generated.

Example 3

(Preparation of a Chitin Chitosan Oligosaccharide Mixture-CCOS)
One part of NACOS and one part of COS will be mixed in a powder mixer→classification→packaging→final product

Example 4

(Clinical Studies)

A clinical study testing the efficacy of chitin chitosan oligosaccharides (CCOS) was conducted by JDC (Hawaii) Inc. encompassing the period of August 1999 to December 2000. This time frame includes the peak cold seasons of fall and winter of 1999 and 2000 as well as the "off seasons including the so-called "summer cold". The participants in the study were all volunteers and were broken into two main groups:

1. a study group consisting of those taking CCOS usually in the dosage of at least 300 mg/day (1 tablet contains 100 mg of CCOS-see Table 3 for details)
2. a control group who did not take CCOS. A handful of these individuals reported trying a variety of methods (see Table 8).

The study was completely random and included both males and females of varying ages, races, and personal habits, including smoking. The latter was not considered a factor in the study because:

Tobacco smoke is ubiquitous in modem society both through primary and secondary exposure.

The mechanism of action of CCOS on the common cold is not particularly related to the pulmonary health of the individual; rather, ii involves ICAM-1/rhinovirus receptor sites first and cytokine/immune system with infection. The efficacy of CCOS on the immune system has been shown in previous patents (U.S. Pat. No. 4,971,956).

A) Takers of CCOS—The personal and demographic characteristics of the study group are summarized in Table 1.

TABLE 1

The Study Group (those taking CCOS)

| | # Total | Age Range | Average Age |
|---|---|---|---|
| all participants | 46 | 33–92 | 61.7 |
| male | 22 | 45–79 | 62.2 |
| Female | 24 | 33–92 | 61.3 |

The study group's geographic range included Japan, Germany, the mainland USA and Hawaii. This data is summarized in Table 2.

TABLE 2

Geographic Characteristics of Those Taking CCOS

| Location | # (male and female) |
|---|---|
| Hawaii | 23 |
| Japan | 9 |
| Washington state | 2 |
| California | 6 |
| Kansas | 1 |
| Texas | 3 |
| other (Germany) | 2 |

Participants in the study group were asked to fill out the questionnaire presented as Appendix 1. The most frequent dosage schedule used by the study group was 1 tablet (100 mg TID). However, due to the lack of toxic side effects of CCOS and the pleasant taste of the current marketed CCOS product (CocoOligo, by JDC-Hawaii Inc.) dosages taken are somewhat variable. The dosages as taken by the participants in the study group are summarized in Table 3.

TABLE 3

Dosages of CCOS Used by Study Group (self-reported)

| DOSAGE | # PARTICIPANTS USING |
| --- | --- |
| 1 Tab TID | 18 |
| 2 Tabs TID | 11 |
| 3 Tabs TID | 8 |
| Other | 9 |
| 3 Tabs BID | 2 |
| 2 Tabs per day | 1 |
| 1 Tab per day | 2 |
| 4 Tabs per day | 2 |
| 3 Tabs at once per day | 1 |
| 7 Tabs per day in divided doses | 1 |

Participants in the study group were asked to describe their symptoms, if applicable, as per Appendix 1. These included:
cough
fever and/or chills
runny nose
watery, scratchy, or itchy eyes
sore or scratchy throat
other The 46 people in the study group (those taking CCOS) showed a distribution of the common cold as displayed in Table 4.

TABLE 4

Occurrence of Common Cold in Study Group (CCOS)

| NO COLD | COLD |
| --- | --- |
| male-19 | male-4 |
| female-19 | female-4 |
| Total Participants-38/46 (82.6) | Total Participants 8/46 (17.4%) |

B) Non-Takers of chitin chitosan oligosaccharide (CCOS)

The control group consisted of 43 adult volunteers who agreed to participate in the study and who did not take chitin chitosan oligosaccharide and who described their experience with the common cold in the period of August 1999–December 2000 in the form as presented in Appendix 2. The participants basically represent a rather typical medical practice that did not use CCOS (or any other specific remedy) for common cold prevention, from a service group (The Kona Rotary Club), and random people from the general population. The overall characteristics of the control group are summarized in Table 5.

TABLE 5

General Characteristics of Control Group (those not taking CCOS)

| Number of Participants | Age Range |
| --- | --- |
| Total = 43 | 38–79 |
| males = 26 | 45–71 |
| females = 15 | 38–79 |

(note: 2 participants declined to state their sex)

The geographic spread of the control group (those not taking CCOS) participants was largely from Hawaii with some individuals from the mainland and Canada as well as Japan. The participants were asked to relate their cold experiences in the study time frame the same as the study group (those taking CCOS) according to the form in Appendix 2 and summarized by the symptom review as follows:
cough
fever and/or chills
runny nose
watery, swollen, itchy eyes
scratchy or sore throat
other (please specify)

The experience with the common cold in the control group is summarized in Table 6.

TABLE 6

Common Cold Experience of Control Group (not taking CCOS)

| NO COLD | COLD |
| --- | --- |
| 17/43 (39.5%) | 26/43 (60.5%) |

A comparison of the Study Group (those taking CCOS) and the Control Group (those not taking CCOS) is presented in Table 7.

TABLE 7

A Comparison of the Occurrence of the Common Cold Between the Study Group and the Control Group

| Study Group (CCOS) | Control Group (no CCOS) |
| --- | --- |
| Total Participants = 46 | Total Participants = 43 |
| Total colds = 8 | Total colds = 26 |
| % Infection = 17.4% | % Infection = 60.5% |

The CCOS group, similar to the control group in race, age, sex and geographic distribution including Japan, Hawaii, and the mainland USA displays a clear (almost 40%) reduction in the incidence of clinical rhinovirus infection. Of further interest, of those in the study group that did not catch the common cold in the study period, 69.6% report that this is unusual for them. Specifically, respondents stated a reduction in the number of colds that is usual for them according to the data in Table 8.

TABLE 8

Frequency of the Common Cold in Study Group (CCOS) Before and After CCOS

| Respondents | Before CCOS | After CCOS |
| --- | --- | --- |
| 0–1 colds/year | 16 | 0 |
| 2–3 colds/year | 12 | 0 |
| 3–4 colds/year | 12 | 0 |
| more than 4 colds/year | 4 | 0 |

This represents a virtual 100% reduction in this group and a 69.4% reduction overall.

Of the 9 participants in the study group who reported catching a cold in the study period, 7 reported that CCOS either shortened the duration of their disease or lessened the severity of their symptoms or both according to Table 9.

TABLE 9

Effect of CCOS on Duration and Symptoms of Common Cold

| Effect | Number of Positive Responses |
| --- | --- |
| improved symptoms | 1 |
| shortened duration | 2 |
| both | 4 |
| no effect | 2 |

This represents a 82.4% reduction of severity and duration of symptoms of the common cold within the group. Out of the 46 participants in the study group then, 2 (4.3%) showed no protection from the common cold nor any appreciable improvement taking more CCOS.

In the control group (those not taking CCOS) there were 18 participants who stated that they used preventive measures for the common cold. These included:
vitamin C
herbs
fruits and vegetables
vitamin supplements
vitamin C and other vitamin supplements
vitamin C and herbs
vitamin C, herbs, and colloidal silver
vitamin C, herbs, and other supplements This resulted in 60.5% of the participants in this group (control) acquiring infection as compared to 17.4% in the study group. The results are summarized in Table 10.

A clinical study utilizing the signs and symptoms of the common cold was chosen because;
Signs and symptoms are the standard way most physicians diagnose, treat, and follow the course of the common cold in their patients and most people are well aware of the signs and symptoms of the common cold and use these to follow the progress of their own illness. The virus causing the common cold is virtually ubiquitous, the most common microbiologic infection in the world; therefore, viral cultures and titers are of little value.
rhinovirus cultures and titers and ICAM-1 levels are not readily available and are difficult to interpret in view of the pathobiology of rhinovirus infection and the common cold.
Admittedly, such conditions as asthma, hay fever and other allergies can mimic the common cold at times. However, the individuals in this study that have these other conditions found no difficulty in distinguishing their more chronic conditions from a common cold.

The study and control groups are similar to each other in age and distribution, geographic spread (both groups include both warm and cold climates) and sex. Taking CCOS in the standard dose of 100 mg TID as well as numerous variations due to the virtual absence of toxic side effects (a very wide margin of safety) afforded and 80.4% protection rate from the common cold as compared to 39.5% protection in the control group regardless of what preventive measures, if any were used (vitamin C, herbs, etc). Further, of the nine individuals in the study group, seven reported shortening of duration of symptoms and/or lessening of severity of symptoms. Only 2/46 (4.4%) reported no benefit from CCOS.

From this the present inventors conclude:
1. In the dosages used in this study, the agent of the present invention is effective in preventing the common cold (rhinovirus infection) by altering the ICAM-1/rhinovirus receptor status.
2. The agent of the present invention can reduce the duration and severity of symptoms by their actions on certain cytokines.
3. The agent of the present invention is free of serious toxic side effects and have a very wide margin of safety.

TABLE 10

Comparison of Study Group, Control Group, and Common Cold

| STUDY GROUP (CCOS) | CONTROL GROUP (NO CCOS) |
|---|---|
| # Total = 46 | # Total = 43 |
| males = 22 | males = 26 |

TABLE 10-continued

Comparison of Study Group, Control Group, and Common Cold

| STUDY GROUP (CCOS) | CONTROL GROUP (NO CCOS) |
|---|---|
| females = 24 | females = 15 |
| | Note: 2 participants would not give their gender |
| Dosages of CCOS | Other Methods |
| 100 mg/day-2 | vitamin C |
| 300 mg/day-18 | vitamin C, vitamin supplements, and herbs |
| 400 mg/day-2 | vitamin C and other supplements |
| 600 mg/day 13 | vitamin C, colloidal silver, and herbs |
| 700 mg/day-1 | herbs |
| 900 mg/day-8 | vitamin C and herbs |
| unspecified-2 | fruits and vegetables |
| no cold infection-38/46 (82.6%) | no cold infection-17/43 (39.5%) |
| cold infection-8/46 (17.4%) | cold infection 26/43 (60.5%) |
| reduction of length and/or intensity of symptoms: | |
| yes-6 | |
| no-2 | |
| Overall-44/46 (95.6%) benefit- | |
| no benefit-2/46 (4.4%) | |

EXAMPLE 5

(Testing the Efficacy of Chitin Chitosan Oligosaccharides in Clinically Reducing Pain and Providing Analgesia)

To test the effectiveness of chitin chitosan oligosaccharide (CCOS) in providing satisfactory analgesia in both nociceptive and neuropathic pain, a clinical study was conducted with volunteers suffering from a variety of rather common painful conditions (see Table 11). Pain can be an extremely subjective phenomena; there is no laboratory or radiological test to measure its severity or indeed even its presence as described elsewhere p. 8). However, this does not mean that such pain is not real. "There is a whole literature of validated, subjective tools that are absolutely reliable" (Melvin C. Gitlin, MD Professor of Anesthesiology, Tulane University School of Medicine and Director of the Pain Management Center at the Tulane University Hospital Clinic) The conditions of all of the volunteers in this study have been documented by physicians, in some cases more than one, and their pain substantiated. Other pain studies such as U.S. Pat. No. 6,117,891, 6,117,879, and 6,110,937 have utilized animals such as mice and rats and employ such analgesic tests such as the Tail Flick Test, the Heating Pad Test, and the Writhing test. Our methods, utilizing human subjects is equally valid and acceptable (36). (see Modified McGill Pain form used as the basis to evaluate pain).

TABLE 11

SUMMARY OF CCOS AND ANALGESIA IN SELECTED PAIN CONDITIONS

| Patient ID | Age/Sex | Pain Condition | Acute or Chronic Pain | Nociceptive or Neuropathic Pain or Both | Previous Therapy (if any) | CCOS Schedule | Degree of Pain Reduction | Time of Induction |
|---|---|---|---|---|---|---|---|---|
| JG | 54/M | dental caries, gingivitis, jaw abscess | A | nociceptive (inflammatory) | Pen VK, Percocet | 2 g STAT; then 1 g QID | 100% | <30 minutes |
| JG | 54/M | surgical extraction of upper teeth | A | neuropathic | Lorcet 1065; | CCOS 500 mg QID | 90% with Lorcet 1065; 100% with CCOS | <30 minutes w/Lorcet 1065; <30 minute/ CCOS |
| JG | 54/M | surgical extraction of lower teeth | A | neuropathic | none | 500 mg STAT; then 400 mg–500 mg QID PRN | 100% | <30 minutes |
| DA | 69/F | Stage IV multiple myeloma w/mets to liver and eye | A & C | nociceptive with overlap | morphine 2.0 mg continuous IV drip | 90 g STAT; then 10–15 g QID | ↓morphine to 0.2 mg drip; then after 2 weeks no morphine needed | as described |
| WH | 47/M | gastric leimyosarcoma w/ mets to liver, spine, legs | A & C | nociceptive | morphine 10 mg q 6 hrs | 15 g STAT; then 3–5 g QID PRN | 80% reduction within 1 week; ↓morphine to 1 tab "occasionally" | |
| LG | 55/F | low back pain 2° to strain | A & C | nociceptive | none (allergic to ASA, narcotics & Tylenol) | 400 mg STAT; Then 300 mg QID | 100% | <30 minutes |
| JR | 42/M | osteoarthritis, neck & shoulders | C | both | none | 100 mg TID | 90–100% | induction of analgesia several days; now largely eliminated |
| TL | 50/M | ulnar epicondylitis | C | both | NSAIDS (NOS) | 200 mg TID | 100% | 4 days; quit NSAIDS |
| AK | 78/M | Osteoarthritis, hip | C | both | none | 1.5 g/day | 100% | complete relief with 1 week |
| FW | 76/M | Osteoarthritis, hands | C | both | none | 200 mg TID | 100% | within 1 hr |
| MK | 64/F | acute pharangitis | A | nociceptive (inflammatory) | none | 200 mg QID | 100% | <30 minutes |
| EM | 78/M | dental caries and periodontitis | A & C | both (patient had surgery) | none | 300 mg TID; then 300 mg PRN | 100% | <30 min; then complete relief |
| KH | 45/F | dental caries, gingivitis, periodontitis | A | nociceptive (inflammatory) | ASA | 3 g STAT to mouth; then 1 g PRN | 95% | essentially immediate; then complete analgesia until therapy |
| JW | 40/M | acute pharangitis | A | nociceptive (inflammatory) | "lozenges" | 150 mg STAT; then 100 mg PRN | 100% | <30 minutes |

Example 6
(Pertaining to Results on Volunteers)

Volunteers JG, KH, and EM—These patients all suffered from dental caries and gingivitis with varying degrees of periodontitis (JG and EM). Tooth pain is arguably one of the most unpleasant of all human experiences and has its origins along nociceptors utilizing the delta and C fibers and in these three examples include an inflammatory component (nociceptive inflammatory pain) to include cytokines. and as evidenced by the clinical findings of swelling of the jaw and mouth and discharge. In these examples, JG and KH used pure CCOS powder; JG took the powder orally dissolved in juice while KH applied the powder directly to the involved mandibular teeth. Complete analgesia was obtained in the former case within 30 minutes while direct application resulted in virtually immediate complete pain relief. The duration of action in all cases was >12 hours. Bradykinin has been shown to be present in diseases of the teeth and jaws as have been the bradykinin receptors B1 and B2 (39, 40, 41). These afford examples of the effects of CCOS on the terribly painful conditions of caries, gingivitis, and periodontitis by blocking the actions of bradykinin (and perhaps other pro-inflammatory and pain mediating kinins) both systemically and by direct application.

Example 6
(More Results of CCOS and Pain Reduction-surgical Pain)

JG, in the previous example, subsequently underwent complete mouth extraction, both upper and lower teeth, utilizing both local and nitrous oxide anesthesia in 2 stages. The maxilla was extracted first; after extraction JG was placed on Percocet (Percodan and Tylenol) every 4–6 hours which resulted in about an 80% reduction of pain at about 30 minutes. This was then alternated with CCOS 500 mg every 4–6 hours which provided similar analgesia but without the unwanted side effects of a narcotic such as constipation and an unwanted "high". The CCOS had no such side effects.

Following the mandibular extraction, JG used CCOS in the form of CocoOligo 300 mg-500 mg every 4–6 hour PRN without narcotic support. He reported in his McGill virtual complete pin reduction equal to or superior to Percocet and was free from any troublesome and unwanted side effects.

These examples display the analgesic effects of CCOS on pain that is largely neuropathic (with some nociceptive inflammatory element) in origin. Bradykinin, acting on both its B1 and B2 receptors has been shown to promote pain hypersensitivity in such nerve injuries. Again, none of the other side effects commonly associated with narcotic pain killers or NSAIDS (heartburn, bleeding, etc) was experienced.

Example 7
(More Results of the Effect of CCOS on Pain-cancer Pain)

DA and WH are both cancer victims with extensive metastatic disease. DA suffered from stage IV multiple myeloma with metastases to the right eye (with blindness) and liver (with a huge abdominal mass) as well as extensive bone involvement both above and below the diaphragm. WH suffered a gastric leiomyosarcoma (smooth muscle malignancy) with metastases to the liver, spine and lungs. Prior to using CCOS in pure powder form, DA was requiring morphine 2.0 mg hourly IV drip (DA weighed 89 lb.). After about 2 days of pure CCOS powder, 15 g STAT then 1 tsp. powder (4 g) in juice every 4–6 hours, the pain had largely disappeared such that the morphine was reduced to 0.25 mg. Within 2 weeks, the pain had abated to the point that she no longer required morphine. WH was in constant pain from his metastases and had essentially an open prescription for morphine. When he volunteered for the study he stated he was taking "a lot of morphine". He was place on 1 tsp. pure CCOS powder (about 4 grams) every 4–6 hours. Within 2 weeks, his pain was "80% gone" and he took "only occasional morphine, sometimes not even 1 a day"

Cancer pain, while certainly one of the most unpleasant and dreaded complications of the disease, is surprisingly elusive in its pathobiology. Among the factors are:
the mass effect (an enlarging tumor compressing and injuring adjacent structures
tissue destruction
nerve compression and destruction
hemorrhage and infection
hormonal factors (much like toxohormone-L influences cachexia)
kinins, such as bradykinin The mechanism of metastatic bone pain is largely nociceptive (somatic); however, both neuropathic and nociceptive stimuli may overlap (47) The analgesic effect of CCOS on these cancer victims was rather striking.

Example 8
(More Results of CCOS in Providing Pain Relief-the Arthropathies)

Patients AK, JR, and FW are all males suffering from osteoarthritis involving the hip, neck, shoulders, and hands. Osteoarthritis involves primarily nociceptive pain responders with some overlap depending upon nerve involvement. The disease is classically called "degenerative arthritis" denoting the fact that the basic disease process is one of degeneration rather than inflammation, which is secondary. Thus, traditional treatment with NSAIDS (non-steroidal anti-inflammatory drugs), including the new COX-2 inhibitors like Celebrex are only minimally successful in reducing pain since inflammation is not a feature of the disease. Not only does CCOS help reduce the damage to the articular cartilage, but bradykinin receptors B1 and B2 are present in the synovial tissue cells and bradykinin is generated into the synovial fluid during the disease process (43, 44, 45). These examples illustrate These examples illustrate the overall effectiveness of CCOS in providing analgesia for this disease. Interestingly, none of these patients was taking NSAIDS or other medication for their arthritis prior to volunteering for the study because they all stated "nothing worked".

Example 9
(More Results of CCOS and Analgesia-acute Inflammatory Pain)

MK and JW were classic examples of simple acute inflammatory pain (nociceptive pain) treated quickly, effectively, and safely with CCOS. Clinically, both patients had severe throat and neck pain with difficulty swallowing which clinically appeared to be viral pharangitis although no cultures were obtained. In both instances, the pain was virtually completely eliminated in less than 30 minutes by 300 mg and 400 mg of CCOS respectively. JW had tied ASA and lozenges about 2 hours earlier with no significant improvement in pain symptoms. CCOS has been shown to possess both anti-viral and anti-bacterial activity; however, it is doubtful that such activity could explain such a rapid induction of analgesia in these cases of nociceptive inflammatory pain.

Example 9
(More Results of CCOS and Analgesia-musculoskeletel Pain)

TL was a 50 year old man suffering from ulnar epicondylitis (tennis elbow) for a number of months for which he took NSAIDS with minimal relief. When he took 200 mg CCOS three times per day, the pain completely disappeared in 4 days and he discontinued the NSAIDS. Now, the same dosage of CCOS three times per day completely eliminates his pain and he is now back to his regular activities. B1 and B2 receptors are present in the synovium of the elbow as well as other joints and the pain relief afforded by CCOS appears to be due to binding and inhibition of bradykinin in these areas.

LG was a 55 year old woman with a several year history of nagging low back pain secondary to repeated strain over the years. Aspercream and Tylenol had little or no effect and the patient could not take ASA due to a history of stomach bleeding; a heating pad afforded modest relief. She took 400 mg of CCOS STAT with almost complete relief in less than 30 minutes. She was pain-free for three hours and then began a regimen of CCOS 300 mg three times per day. She states she has stayed essentially pain free but at times needs to increase the CCOS to 500 mg four times per day.

Back pain is one of the most common ailments seen in any general medical clinic, and often all that can be offered are narcotic pain pills or muscle relaxants such as diazepam (Valium) with all of their hazardous side effects including addiction if used for prolonged periods (which is often the case). It has many causes ranging from sciatica to cancer. In this case, the pain was due to chronic lumbo-sacral strain secondary to repeated bending over and lifting-mostly nociceptive somatic pain which was treated effectively and safely with CCOS.

These examples illustrate the following:

chitin chitosan oligosaccharide (CCOS) provide acceptable analgesia for mild to severe pain in doses ranging from 300 mg up to 60–90 grams per day or more depending upon the situation. It should be noted again that the large doses used in WH and DA were also designed to help treat their malignancies (CCOS has immunostimulatory properties) as well as induce pain relief.

CCOS provides analgesia for both neuropathic and nociceptive pain in both their acute and chronic forms There is a wide margin of safety for CCOS in the range of <100 mg up to >90 grams per day. No adverse effects were reported by any of the volunteers in this study, including the cancer victims.

In summary, the present invention concerns a method of preventing or treating common cold or treating pain by administering the new agent of the present invention in a subject. The term "treating common cold" includes alleviating or ameliorating at least some of the symptoms of common cold.

CITED REFERENCES

1) From *The Common Cold Center*, R. Eccles
2) *Fact Sheet* National Institute of Allergy and Infectious Diseases, National Institute of Health, Bethesda May, 1998
3) *Fast Facts A-Z*, NCHS, National Institutes of Health, Bethesda, Md., Apr. 25,1999
4) Busse W. W., "The role of the common cold in asthma", *J Clin Pharmacol,* 1999 March; 39(3) 241–45
5) Gern J. K., Busse W. W., "Association of rhinovirus infections with asthma" *Clin Microbiol Rev,* 1999 January 12(1) 9–18
6) "Rising asthma deaths 'inexcusable' according to allergists organization" *News Release*, American College of Allergy, Asthma, and Immunology, Oct. 6, 1998
7) Hilding D. A. "Literature review: the common cold", *Ear, Nose, Throat J,* 1994 September; 73(9) 639–43, 46–7
8) Gonzales R, et al "Antibiotic prescribing for adults with colds, upper respiratory tract infections, and bronchitis by ambulatory care physicians", *JAMA* Sep. 17, 1997; 278 (11) 901–4
9) Aukenthaler R, "Common cold: diagnostic steps? Antibiotics?" *Ther Umsch* 1992 April; 49(4) 211–5
10) Mainous A. G., et al, "Antibiotics and upper respiratory infection: do some folks think there is a cure for the common cold?" *J Fam Pract* 1996 April; 42 (4); 357–61
11) Hamila H., "Vitamin C supplementation and the common cold—was Linus Pauling right or wrong?" *Int J Vitam Nutr Res,* 1997; 67 (5); 329–35
12) Hamila H, "Vitamin C supplementation and common cold symptoms; problems with inaccurate reviews", *Nutrition* 1996 November-December; 12 (11–12); 804–09
13) Pitt H. A., Costini A. M., "Vitamin C prophylaxis in marine recruits" *JAMA* Mar. 2, 1979:241 (9); 908–11
14) Hemila H., Douglas R. M. "Vitamin C and acute respiratory infections" *Int J Tuberc Lung Dis,* 1999 September; 3 (9);756–61
15) Karlowski T. R., et al "Ascorbic acid for the common cold. A prophylactic and therapeutic trial" *JAMA* Mar. 10, 1975;231 (10);1038–42
16) Grim W, Muller H H "A randomized controlled trial of the effect of fluid extract of Echinacea purpurea on the incidence and severity of colds and respiratory infections" *Am J Med* 1999 February; 106 (2); 138–43
17) Macknin M L, et al "Zinc gluconate lozenges for treating the common cold in children" *JAMA* Jun. 24, 1998, 279 (24); 1962–67
18) VanKempen M, et al "An update on the pathophysiology of rhinovirus upper respiratory infections" *Rhinology* 1999 September; 37 (3); 97–103
19) Trifilieff A, et al "Kinins and respiratory tract diseases" *Eur Res J* 1993 April; 6 (4); 576–87
20) Brunee T, et al "Nasal challenge studies with bradykinin; influence on mediators" *Clin Ex Allergy* 1991 July; 21 (4); 425–31
21) Rees G L, Eccles R, "Sore throat following nasal and oropharengeal bradykinin challenge" *Acta Otolaryngol (Stockh)* 1994 May; 1143; 311–4
22) Rajakulasingen K, et al "Nasal effects of bradykinin and capaicin; influence on plasma proteins, leakages, and role of sensory neurons" *J Appl Physiol* 1992 April: 72 (4); 1418–24
23) Okamoto Y, et al "Mechanism of analgesic effect induced by chitin and chitosan" *Chitin and Chitosan Research* 1998; 4 (2); 172–74
24) Turner R B, et al "Efficiency of tumacara, a soluble intercellular adhesion molecule for experimental rhinovirus infection: a randomized clinical trial" *JAMA* May 19, 1999; 281 (19); 1797–04
25) Sethi S K, et al "Interferon gamma (INF-gamma) down-regulates the rhinovirus-induced expression of intercellular adhesion molecule one (ICAM-1) on human airway epithelial cells" *Clin Exp Immunol* 1997 December; 110 (3); 362–9
26) Shibata Y, et al "Alveolar macrophage priming by intravenous administration of chitin particles, polymers of N-acetyl glucosamine in mice", *Infect Immun* 1997 May: 65 (5); 1734–4
27) Shibata Y., et al, "Immunoregulatory roles of IL-0 in innate immunity: IL-10 inhibits macrophage production of INF-gamma-inducing factors but enhances NK cell production of INF-gamma" *J Immunol* Oct. 15, 1998;161 (8): 4283–8
28) Dannemiller Memorial Educational Foundation "New Approaches to the Pharmacologic Management of Chronic Non-malignant Pain", December 1998

29) Millan, M. J. "The induction of pain: an integrative view", *Prog Neurobiol* 1999 January; 57 (1)
30) Messlinger, K. "What is a nociceptor?", Anaesthetist 1997 February; (2)
31) Raja, S. N., et al "Peripheral mechanisms of somatic pain" *Anesthesiology* 1988 April; 68 (4)
32) Regoli, D. Et al "Pharmacology of bradykinin and related kinins" *Pharmacology Review* 32 (1) 1980
33) Hall, J, M, "Bradykinin receptors" *Gen Pharmacol* 1997 January; (1)
34) Jarnagin, K. Et al, "Mutations to the B2 bradykinin receptor reveal a different pattern of contacts for peptidic agonists and peptidic antagonists" *J. Biol Chem* 271 (45) 1996
35) Okamoto, Y. et al "Mechanisms of analgesic effect induced by chitin and chitosan" *Chitin and Chitosan Research*, Vol. 4, No. 2, 1998
36) Donovan, M. I., et al "Striving for a standard of pain relief" *Am J. Nurs* 92 (3) 1992
37) Krivo, S., et al "Assessment of patient's pain" *N Engl J Med* 334 (1) 59, 1996
38) Olsen, S. et al "Pain management-an overview of two commonly used methods" *Anesthesiology Review* 19 (6) 1992
39) Griesbacher T, et al "Anti-inflammatory and analgesic activity of the bradykinin antagonist icatibant (HOE-140) against an extract from Porphyromonas gingivalis" *Br J Pharmacol* 1994 August; 112 (4): 1004–6
40) Tsai C C, et al "Measurement of prostaglandin E2 and leukotriene B4 on the gingival crevicular fluid" *J. Dent.* 1998 March; 26 (2): 97–103
41) Iga K, et al "Experimental gingivitis in ODU plaque-sensitive rats V. The presence of bradykinin in activating factor in rat dental plaque" *J. Periodontal* 1980 June; 51 (6): 348–54
42) Levy D, Zochande D W "Increased mRNA expression of the B! and B@ bradykinin receptors and anti-nociceptive effects of their antagonists in an animal model of neuropathic pain" *Pain* 2000 June; 86 (3): 265–71
43) Omata T, et al "Effects of chondroitin sulfate-c on bradykinin-induced proteoglycan depletion in rats" *Anzneimittelforschung* 1999 July: 49 (7): 577–81
44) Bond A P, et al "Generation of kinins in synovial fluid from patients with arthropathy" *Immunopharmacology* 1997 June; 36 (2–3): 209–16
45) Cassim B, et al "Immunolocalization of bradykinin receptors in human synovial tissue" *Immunopharmacology* 1997 June; 36 (2–3) 121–5
46) Sharma J N, et al "Pathogenic responses of bradykinin system in chronic inflammatory rheumatoid disease" *Exp. Toxicol. Pathol.* 1994 December; 46 (6) 421–33
47) Ripamonti C et al "Malignant bone pain: pathophysiology and treatment" *Curr. Rev. Pain.* 2000; 4 (3) 187–96
48) Raidoo D M, et al "Pathophysiology of the kallekrein-kinin system in mammalian nervous tissue" *Phamacol. Ther.* 1998 August; 79 (2) 105–27
49) Ueda H "In vivo molecular signal transduction of peripheral mechanisms of pain" *Jpn. J. of Pharmacol* 1999 March; 79(3): 263–8

APPENDIX 1

Survey Form for Study Group (CCOS)
OligoPower

Date:                                    Age:        Sex:
Name:
Address:
1) Do you take CCOS regularly?        ☐ yes      ☐ no
2) If yes, how much do you take?
    ☐   1 tablet 3 times per day
    ☐   2 tablets 3 times per day
    ☐   3 tablets three times per day
    ☐   other (please state)
  If no, also complete the survey and compare before and after CCOS if possible.
3) How many colds did you usually suffer each season before taking CCOS?
    ☐   0–1
    ☐   2–3
    ☐   3–4
    ☐   more than 4
4) Have you suffered a cold the past 12 months after taking CCOS?
    ☐   yes (if yes, please check items 5), 6), 7), and 8)
    ☐   no (if no, please disregard items 5), 6), 7, and 8)
5) what were your symptoms?
    ☐   cough
    ☐   fever and/or chills
    ☐   runny nose
    ☐   watery, swollen, or itchy eyes
    ☐   sore or scratchy throat
    ☐   other (please state)
6) How long did your symptoms last?
    ☐   1–4 days            ☐   4–7 days
    ☐   7–10 days           ☐   over 10 days
                        (over)
7) Did you take more CCOS?
    ☐   yes
    ☐   no
8) Did the CCOS
    ☐   improve the symptoms
    ☐   shorten the duration of symptoms
    ☐   both
9) If you have not had a cold the past 12 months, is this unusual?
    ☐   yes
    ☐   no
Any other comments:
Again, thank you for your participation in this survey.

Signature

APPENDIX 2

Survey Form for Control Group (No CCOS)
OligoPower

Date:                                    Age:        Sex:
Name:
Address:
Have you had a cold the past 12 months?
    ☐   yes
    ☐   no
If yes, how many?
    ☐   1–2
    ☐   3–4
    ☐   more than 4
Is this the normal number of colds for you?
    ☐   yes
    ☐   no (if no, please explain)
What cold symptoms do you normally have?
    ☐   cough
    ☐   fever and/or chills
    ☐   runny nose
    ☐   watery, swollen, or itchy eyes -continued Survey Form for Control Group (No CCOS)
OligoPower ☐ scratchy or sore throat
☐ other (please explain)
On the average, how long did your symptoms last?
☐ 1–3 days
☐ 3–5 days
☐ 5–7 days
☐ more than 7 days

What is claimed is:

1. A method for preventing or treating common cold, comprising administering an effective amount of an agent in a subject in need of such prevention or treatment, said agent comprising at least one component selected from the group consisting of
    a) at least one chitin oligosaccharide;
    b) at least one chitosan oligosaccharide;
    c) at least one partially deacetylated chitin oligosaccharide, wherein some, but not all, of the 2-acetamido-2-deoxy-D-glucose subunits are de-acetylated;
    d) a mixture of at least one chitin oligosaccharide and at least one chitosan oligosaccharide;
    e) a mixture of at least one chitin oligosaccharide and at least one partially deacetylated chitin oligosaccharide; and
    f) a mixture of at least one chitosan oligosaccharide and at least one partially deacetylated chitin oligosaccharide.

2. The method of claim 1, wherein said agent comprises at least one component selected from the group consisting of
    a) at least one chitin oligosaccharide;
    b) at least one chitosan oligosaccharide; and
    c) a mixture of at least one chitin oligosaccharide and at least one chitosan oligosaccharide.

3. The method of claim 2, wherein said component is a mixture of at least one chitin oligosaccharide and at least one chitosan oligosaccharide.

4. The method of claim 1, wherein said at least one chitin oligosaccharide is a chitin oligosaccharide of 2 to about 10 N-acetyl glucosamine subunits; wherein said at least one chitosan oligosaccharide is a chitosan oligosaccharide of 2 to about 10 glucosamine subunits.

5. The method of claim 4, wherein said at least one chitin oligosaccharide is selected from the group consisting of N-acetyl chitobiose, di-N-acetyl chitobiose, tri-N-acetyl chitotriose, tetra-N-acetyl chitotetraose, penta-N-acetyl chitopentaose, hexa-N-acetyl chitohexaose, hepta-N-acetyl chitoheptose, and octa-N-acetyl chitooctose; wherein said at least one chitosan oligosaccharide is selected from the group consisting of chitobiose, chitotriose, chitotetraose, chitopentaose, chitohexaose, chitoheptaose and chitooctose.

6. The method of claim 2, wherein said component is water soluble.

7. The method of claim 3, wherein said component is water soluble.

8. The method of claim 4, wherein said component is water soluble.

9. The method of claim 5, wherein said component is water soluble.

10. The method of claim 1, wherein said subject is a human.

11. A method for treating pain, comprising administering an effective amount of an agent in a subject in need of such treatment, said agent comprising at least one component selected from the group consisting of
    a) at least one chitin oligosaccharide;
    b) at least one chitosan oligosaccharide;
    c) at least one partially deacetylated chitin oligosaccharide, wherein some, but not all, of the 2-acetamido-2-deoxy-D-glucose subunits are de-acetylated;
    d) a mixture of at least one chitin oligosaccharide and at least one chitosan oligosaccharide;
    e) a mixture of at least one chitin oligosaccharide and at least one partially deacetylated chitin oligosaccharide; and
    f) a mixture of at least one chitosan oligosaccharide and at least one partially deacetylated chitin oligosaccharide.

12. The method of claim 11, wherein said agent comprises at least one component selected from the group consisting of
    a) at least one chitin oligosaccharide;
    b) at least one chitosan oligosaccharide; and
    c) a mixture of at least one chitin oligosaccharide and at least one chitosan oligosaccharide.

13. The method of claim 12, wherein said component is a mixture of at least one chitin oligosaccharide and at least one chitosan oligosaccharide.

14. The method of claim 11, wherein said at least one chitin oligosaccharide is a chitin oligosaccharide of 2 to about 10 N-acetyl glucosamine subunits; wherein said at least one chitosan oligosaccharide is a chitosan oligosaccharide of 2 to about 10 glucosamine subunits.

15. The method of claim 14, wherein said at least one chitin oligosaccharide is selected from the group consisting of N-acetyl chitobiose, di-N-acetyl chitobiose, tri-N-acetyl chitotriose, tetra-N-acetyl chitotetraose, penta-N-acetyl chitopentaose, hexa-N-acetyl chitohexaose, hepta-N-acetyl chitoheptose, and octa-N-acetyl chitooctose; wherein said at least one chitosan oligosaccharide is selected from the group consisting of chitobiose, chitotriose, chitotetraose, chitopentaose, chitohexaose, chitoheptaose and chitooctose.

16. The method of claim 12, wherein said component is water soluble.

17. The method of claim 13, wherein said component is water soluble.

18. The method of claim 14, wherein said component is water soluble.

19. The method of claim 15, wherein said component is water soluble.

20. The method of claim 11, wherein said subject is a human.

21. The method of claim 1, wherein said agent further comprises N-acetyl glucosamine and/or glucosamine.

22. The method of claim 11, wherein said agent optionally further comprises N-acetyl glucosamine and/or glucosamine.

23. A method for alleviating symptoms of common cold, comprising administering an effective amount of an agent in a subject in need of such alleviation, said agent comprising at least one component selected from the group consisting of
    a) at least one chitin oligosaccharide;
    b) at least one chitosan oligosaccharide;
    c) at least one partially deacetylated chitin oligosaccharide, wherein some, but not all, of the 2-acetamido-2-deoxy-D-glucose subunits are de-acetylated;

d) a mixture of at least one chitin oligosaccharide and at least one chitosan oligosaccharide;
e) a mixture of at least one chitin oligosaccharide and at least one partially deacetylated chitin oligosaccharide; and
f) a mixture of at least one chitosan oligosaccharide and at least one partially deacetylated chitin oligosaccharide.

* * * * *